US011261750B2

(12) United States Patent
Landwehr et al.

(10) Patent No.: US 11,261,750 B2
(45) Date of Patent: Mar. 1, 2022

(54) CMC BLADE TRACK WITH INTEGRAL ABRADABLE

(71) Applicants: Rolls-Royce North American Technologies Inc., Indianapolis, IN (US); Rolls-Royce Corporation, Indianapolis, IN (US)

(72) Inventors: Sean Landwehr, Avon, IN (US); Ted Freeman, Danville, IN (US); Aaron Sippel, Zionsville, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 974 days.

(21) Appl. No.: 15/935,721

(22) Filed: Mar. 26, 2018

(65) Prior Publication Data
US 2019/0292931 A1 Sep. 26, 2019

(51) Int. Cl.
*C04B 35/622* (2006.01)
*F01D 11/12* (2006.01)
*B32B 18/00* (2006.01)
*C04B 41/45* (2006.01)
*C04B 35/117* (2006.01)
(Continued)

(52) U.S. Cl.
CPC .......... *F01D 11/122* (2013.01); *B32B 18/00* (2013.01); *C04B 35/117* (2013.01); *C04B 35/18* (2013.01); *C04B 35/622* (2013.01); *C04B 35/62222* (2013.01); *C04B 35/80* (2013.01); *C04B 41/45* (2013.01); *C04B 41/4596* (2013.01); *F01D 11/125* (2013.01); *C04B 2235/5216* (2013.01); *C04B 2235/5224* (2013.01); *C04B 2235/5228* (2013.01); *C04B 2235/5256* (2013.01); *F05D 2230/31* (2013.01); *F05D 2300/6033* (2013.01)

(58) Field of Classification Search
CPC ............... C04B 41/45; C04B 41/4596; C04B 35/62222; C04B 35/622; C04B 2235/5224; C04B 2235/5228; C04B 2235/5256; C04B 2235/5252; C04B 2237/38; F05D 2230/31; F05D 2300/6033
See application file for complete search history.

(56) References Cited

U.S. PATENT DOCUMENTS 7,479,328 B2  1/2009  Roth-Fagaraseanu et al.
7,955,707 B2  6/2011  Xie et al.
(Continued)

*Primary Examiner* — Noah S Wiese
(74) *Attorney, Agent, or Firm* — Crowell & Moring LLP

(57) ABSTRACT

A system and method for forming a ceramic matrix composite blade track is provided. The method may include stacking a plurality of first plies to form a first porous preform layer, the first plies including a plurality of first ceramic fibers. The method may further include stacking a plurality of second plies to form a second porous preform layer, the second plies including a plurality of second ceramic fibers. The method may further include combining the first porous preform layer and the second porous preform layer to form a unified porous preform. The method may further include forming a structural layer by infiltrating the first porous preform with a first ceramic matrix material, and forming an abradable layer by infiltrating the second porous preform with a second ceramic matrix material.

15 Claims, 7 Drawing Sheets

(51) Int. Cl.
*C04B 35/18* (2006.01)
*C04B 35/80* (2006.01)

(56) References Cited

U.S. PATENT DOCUMENTS

| | | | |
|---|---|---|---|
| 8,309,197 B2* | 11/2012 | Davis | B32B 9/005 |
| | | | 428/86 |
| 2008/0274336 A1 | 11/2008 | Merrill et al. | |
| 2016/0356497 A1* | 12/2016 | Freeman | F01D 5/284 |
| 2017/0044921 A1* | 2/2017 | Vetters | F01D 25/246 |
| 2017/0113976 A1* | 4/2017 | Shim | C04B 41/91 |

* cited by examiner

CMC BLADE TRACK WITH INTEGRAL ABRADABLE

TECHNICAL FIELD

This disclosure relates to fabrication of ceramic matrix composites (CMCs) and, in particular, to multi-layer CMCs.

BACKGROUND

Ceramic matrix composites (CMCs), which include ceramic fibers embedded in a ceramic matrix, exhibit a combination of properties that make them promising candidates for industrial applications for which excellent thermal and mechanical properties along with low weight may be advantageous, such as gas turbine engine components.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a method for making a ceramic matrix composite including multiple layers is described. The method may include forming a structural layer including first ceramic fibers. The method may further include forming an abradable layer including second ceramic fibers. The first porous preform layer and the second porous preform layer may be coupled together to form a blade track. The structural layer may be infiltrated with a first ceramic matrix material and the abradable layer may be infiltrated with a second ceramic matrix material.

One interesting feature of the systems and methods described below may be that the abradable layer degrades in strength at temperatures of operation of a gas turbine engine in which the blade track is installed. The degradation of strength of the abradable layer may facilitate incursion by blades in the gas turbine engine. Alternatively, or in addition, an interesting feature of the systems and methods described below may be that the abradable layer may insulate the structural layer from high operation temperatures inside the gas turbine engine. Alternatively, or in addition, the abradable layer may include a smaller fiber fraction than the structural layer, thus allowing for an easier rub with the blades in the gas turbine engine.

Figure 1:
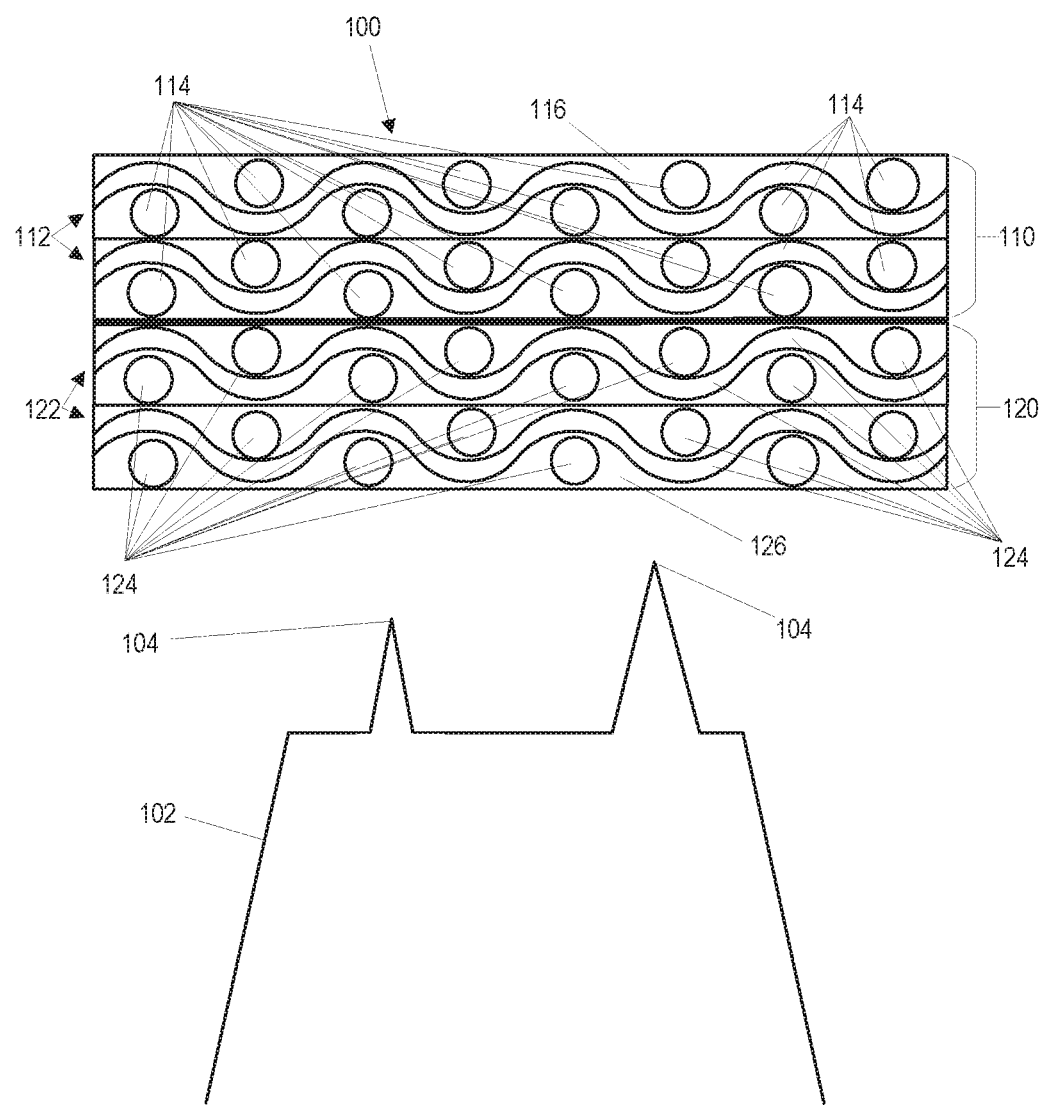
FIG. 1 illustrates a cross-sectional view of an example system of a ceramic matrix composite blade track.

FIG. 1 illustrates a cross-sectional view of an example system of a ceramic matrix composite blade track, hereinafter referred to simply as a blade track 100. The blade track 100 may include at least two layers: a structural layer 110 and an abradable layer 120. Each of the at least two layers may be ox-ox ceramic matrix composite layers and may include both oxide fibers and oxide matrix material. The blade track 100 may be a track that guides blades 102 as the blades 102 rotate within a turbine section of a gas turbine engine.

In FIG. 1, the blade track 100 is shown spaced apart from the blades 102, but when properly installed and operational, the blade track 100 and the blades 102 would be in contact with each other or at least within a predetermined distance of each other. The blade track 100 may include an indentation or recess (not shown) that allows insertion of a tip 104 of the blade 102. Alternatively, the blades 102 may carve the indentation or recess. With the tip 104 of the blade 102 extending into the recess or indentation, the tip 104 of the blade 102 may limit or block fluid in the gas turbine engine from travelling over the tip 104 of the blade 102. As a result of the tip 104 of the blade 102 extending into the recess or indentation, fluid in the gas turbine engine may be redirected to flow around an airfoil portion (not shown) of the blade 102.

The structural layer 110 may be a layer of the blade track 100 that maintains strength at operation temperatures of a gas turbine in which the blade track 100 is installed. The structural layer 110 may include structural ceramic fibers 114 and a structural matrix material 116. The structural ceramic fibers 114 may include ceramic fibers comprising, for example, any oxide fiber material. In some examples, the structural ceramic fibers 114 include alumina or aluminosilicate. Examples of suitable structural ceramic fibers 114 include NEXTEL 720 and NEXTEL 610 fibers (NEXTEL is a trademark of 3M Corporation), which are ceramic structural fabrics made from continuous oxide composite grade fibers designed for load bearing applications.

In some examples, the structural ceramic fibers 114 may be arranged in fiber tows. Alternatively, the structural ceramic fibers 114 may be individual fibers dispersed in the structural layer 110. In some examples, the structural ceramic fibers 114 may be arranged in one or more structural plies 112. The structural plies 112 may be two-dimensional (2-D) plies including the structural ceramic fibers 114. The structural plies 112 may be stacked or arranged one on top of another in order to form the structural layer 110. For example, a first structural ply 112 may be stacked onto a second structural ply 112 with the structural ceramic fibers 114 of each structural ply 112 offset to avoid complications with structural ceramic fibers 114 of each structural ply 112 applying pressure on other structural ceramic fibers 114.

Alternatively or in addition to the structural plies 112, the structural ceramic fibers 114 may be constructed in a wet layup by filament winding or fiber placement. For example, fiber tows may be infiltrated with the structural matrix material 116 and subsequently wound in a filament winding process. Alternatively, a fiber placement method may be used wherein structural ceramic fibers 114 are placed in predetermined positions in the structural layer 110. Alternatively, the structural ceramic fibers 114 may be woven in a 3-D orientation (shown in FIG. 3 and discussed below).

In addition, the structural layer 110 includes the structural matrix material 116. The structural matrix material 116 may be ceramic material that is infiltrated between the structural ceramic fibers 114 and densifies the structural layer 110. Alternatively or in addition, in some examples, a silica content of the structural matrix material 116 may be approximately 40% by volume, wherein "approximately" means+/−

5%. Examples of the structural matrix material 116 may include porous alumina and aluminosilicate.

The abradable layer 120 may be a layer of the blade track 100 that degrades in strength at operation temperatures of the gas turbine engine in which the blade track 100 is installed. The degradation of strength of the abradable layer may assist incursion of the blades 102 into the abradable layer 120 and facilitate formation of an indentation or recess in the blade track 100 to guide the blades 102. The abradable layer 120 may include abradable ceramic fibers 124 and an abradable matrix material 126. The abradable ceramic fibers 124 may include ceramic fibers comprising, for example, any oxide fiber material. The abradable ceramic fibers 124 are made of different material than the structural ceramic fibers 114, such that the abradable layer 120 degrades in strength at the operation temperatures of the gas turbine engine in which the blade track 100 is installed. The abradable ceramic fibers 124 may include silicate glass, alumina, or aluminosilicate fibers such as Nextel 440, Nextel 312, and E-glass fibers.

In some examples, the abradable ceramic fibers 124 may be arranged in fiber tows. Alternatively, the abradable ceramic fibers 124 may be individual fibers dispersed in the abradable layer 120. In some examples, the abradable ceramic fibers 124 may be arranged in one or more abradable plies 122. The abradable plies 122 may be stacked on one another in order to form the abradable layer 120. For example, a first abradable ply 122 may be stacked onto a second abradable ply 122 with the abradable ceramic fibers 124 of each abradable ply 122 offset to avoid complications with abradable ceramic fibers 124 of each abradable ply 122 applying pressure on other abradable ceramic fibers 124.

Alternatively or in addition to the abradable plies 122, the abradable ceramic fibers 124 may be constructed in a wet layup by filament winding or fiber placement. For example, fibers tows may be infiltrated with an abradable matrix material 126 and subsequently wound in a filament winding process. Alternatively, a fiber placement method may be used wherein abradable ceramic fibers 124 are placed in predetermined positions in the abradable layer 120. Alternatively, the abradable ceramic fibers 124 may be woven in a 3-D orientation (shown in FIG. 3 and discussed below).

The abradable ceramic fibers 124 may comprise, continuous and/or discontinuous fibers. In examples of the abradable ceramic fibers 124 that include continuous fibers, the abradable ceramic fibers 124 may be, for example, unidirectional or biased in a circumferential direction of the blade track 100. As used herein, "continuous fibers" may be fibers or fiber tows that stretch from an end to an opposite end of each part, or for example, of each ply. In contrast, "discontinuous fibers" may refer to fibers that are randomly arranged, for example, within each ply. In examples of the abradable ceramic fibers 124 include discontinuous fibers, a fiber mat may be used to facilitate layup or a fiber chopper gun with simultaneous resin/slurry spray may be used. For example, the fiber mat method may include flattening discontinuous, chopped fibers into a flat sheet or other shape. Benefits of using chopped fibers is that the shape formed from the flattening of the chopped fibers may be a shape other than a flat sheet. In addition, a benefit of using chopped fibers is that the fiber mat formed may be more abradable, or put another way, may be easier for a blade tip to cut through. Density of the fiber mat could be tailored to have low fiber density in areas expected to rub and higher density where structural support is required. In some examples, the fiber chopper gun may be used. For example, the fiber chopper gun may chop or separate a source fiber into discontinuous fibers. In addition, the fiber chopper gun method may include applying ceramic matrix material to the discontinuous fiber. The ceramic matrix material may be applied to the discontinuous fibers simultaneously to the chopping of the source fiber or as a separate, discrete process.

In some examples, the structural ceramic fibers 114 may be more closely arranged in the structural layer 110 than the abradable ceramic fibers 124 are arranged in the abradable layer 120. Put another way, a fiber density in the structural layer 110 may be greater than a fiber density in the abradable layer 120. The greater fiber density of the structural layer 110 may facilitate greater structural integrity and strength of the structural layer 110 compared to the abradable layer 120. Alternatively or in addition, the lower fiber density of the abradable layer 120 compared to the structural layer 110 may facilitate incursion of the blades 102 into the abradable layer 120 compared a situation wherein the blades 102 were to incur on the structural layer 110 instead.

In addition, the abradable layer 120 includes the abradable matrix material 126. The structural matrix material 126 may be ceramic material that is infiltrated between the abradable ceramic fibers 124 and densifies the abradable layer 120. Alternatively or in addition, in some examples, a silica content of the abradable matrix material 126 may be approximately 40% by volume, wherein "approximately" means+/−5%. Examples of abradable matrix material 126 may be porous alumina or aluminosilicate. The abradable matrix material 126 may be the same or of a different composition than the structural matrix material 116.

Figure 2:
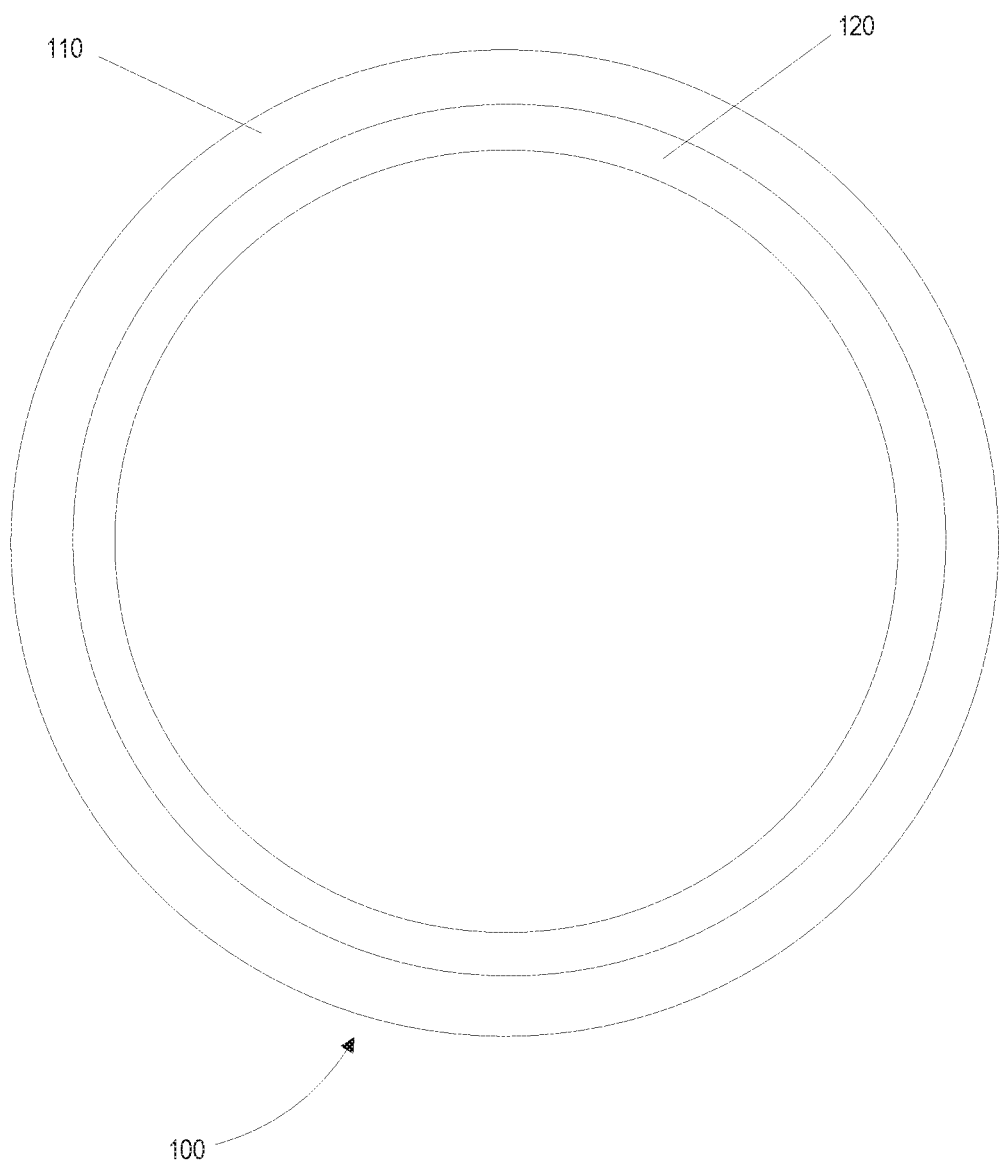
FIG. 2 illustrates an example of a ceramic matrix composite blade track formed in an annulus.

FIG. 2 illustrates an example of the blade track 100, structural layer 110, and abradable layer 120 formed in an annulus. The abradable layer 120 is located radially inward from the structural layer 110. The abradable layer 120 may serve as an insulating layer that may shield the structural layer 110 from the hot, high pressure air located in the gas turbine engine. Alternatively or in addition, the abradable layer 120 may be exposed to the blades 102 to facilitate incursion of the blades 102 into the blade tack 100.

Figure 3:
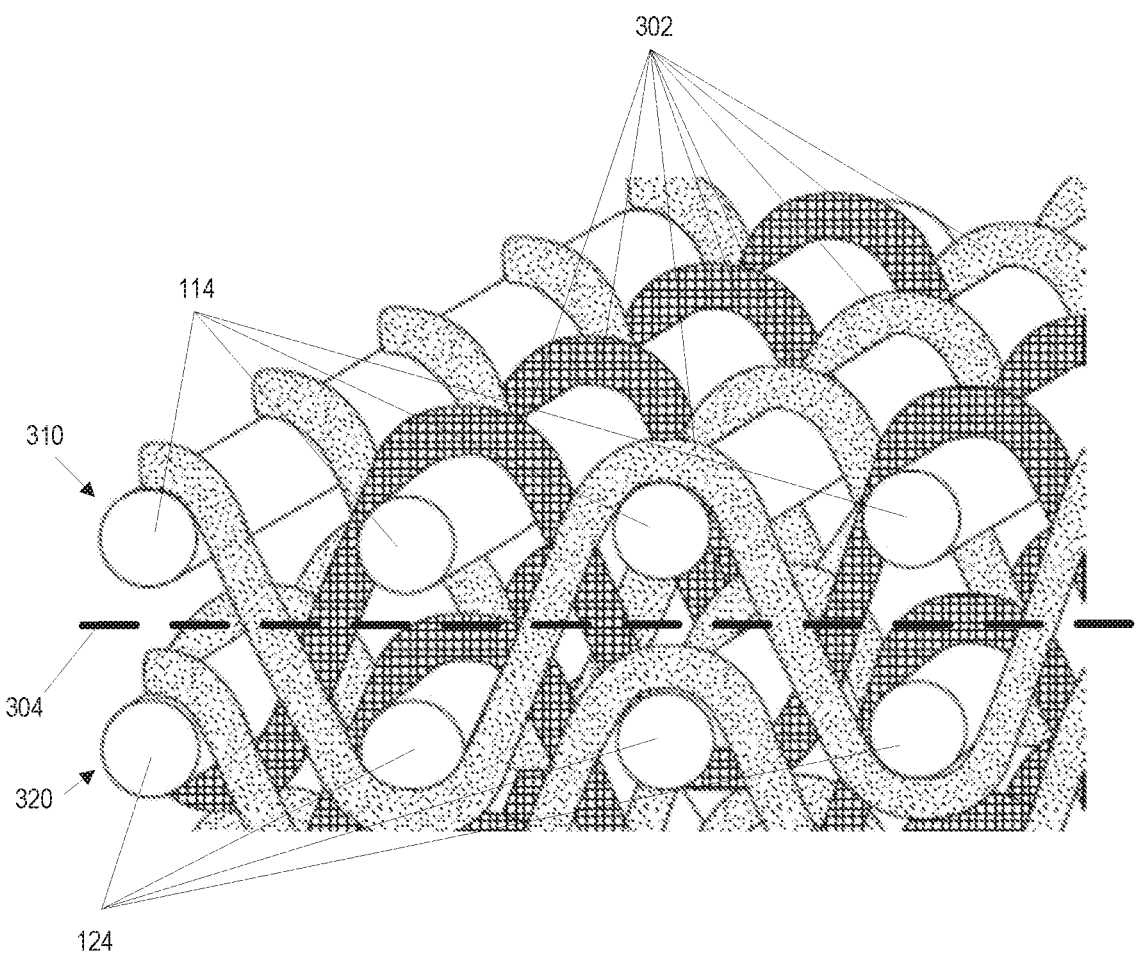
FIG. 3 shows a close-up view of a portion of an example first porous preform layer of a blade track and a portion of an example second porous preform layer of the blade track.

FIG. 3 shows a close-up view of a portion of a structural porous ceramic preform layer 310 and a portion of an abradable porous ceramic preform layer 320. The structural porous ceramic preform layer 310 may include the structural ceramic fibers 112 prior to infiltration by the structural matrix material 116. The abradable porous ceramic preform layer 320 may include the abradable ceramic fibers 122 prior to infiltration by the abradable matrix material 126. In the example shown in FIG. 3, the abradable ceramic fibers 124 are woven in a 3-D orientation in the abradable ceramic preform layer 320 and the structural ceramic fibers 114 are woven in a 3-D orientation in the structural ceramic preform layer 310. In the example shown in FIG. 3, the abradable ceramic preform layer 320 and the structural ceramic preform layer 310 are coupled at an interface 300 by a radial fiber 302. The interface 300 may be a region wherein the structural ceramic preform layer 310 engages the abradable ceramic preform layer 320. In some examples, the interface 300 may be planar. Alternatively, the interface 300 may be non-planar. The interface 300 separates the structural ceramic preform layer 310 from the abradable ceramic preform layer 320.

The radial fiber 302 is a ceramic fiber that runs across the interface 300 and is positioned in both the structural ceramic preform layer 310 and the abradable ceramic preform layer 320. The radial fiber 302 may facilitate the coupling of the structural ceramic preform layer 310 and the abradable ceramic preform layer 320. After the structural ceramic preform layer 310 is infiltrated with the structural matrix material 116 and the abradable ceramic preform layer 320 is infiltrated with the abradable matrix material 126, the radial fiber 302 may facilitate coupling of the structural layer 110 and the abradable layer 120. Alternatively or in addition, the structural layer 110 and the abradable layer 120 may be integrally formed. The integral nature of the structural layer 110 with the abradable layer 120 may be that the structural layer 110 and abradable layer 120 form a single, unitary structure.

Figure 4:
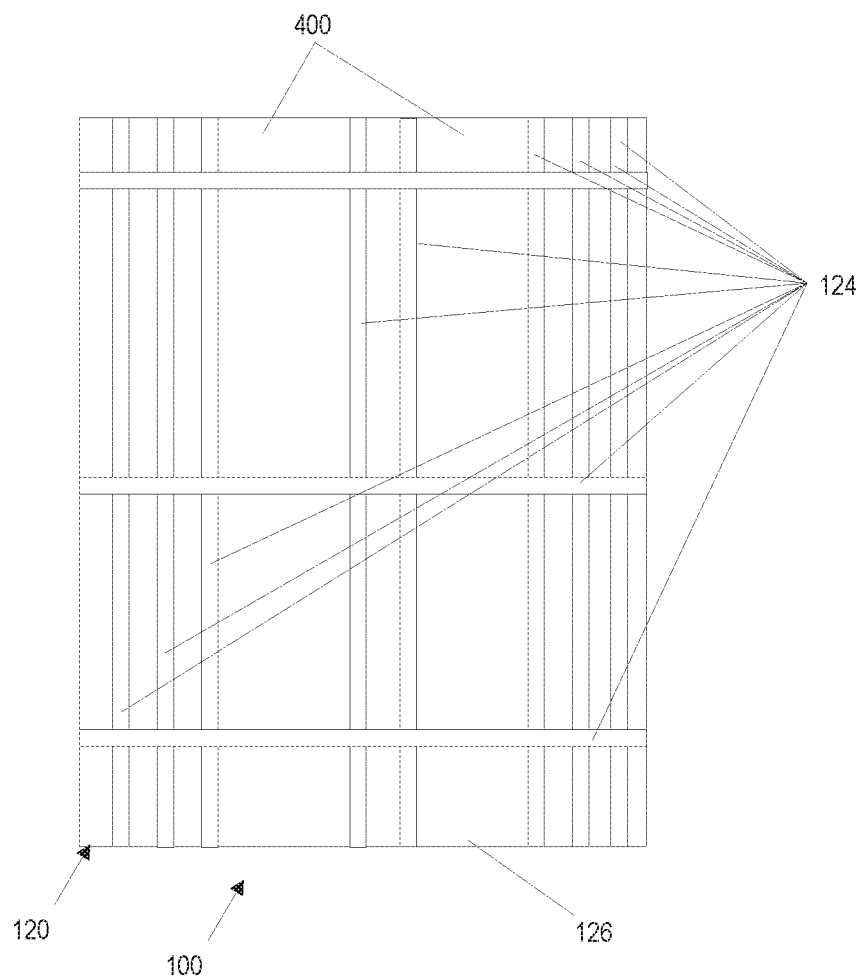
FIG. 4 shows a radially inward side of an example blade track.

FIG. 4 shows a radially inward side of an example of the blade track 100. In the illustrated example, abradable ceramic fibers 124 are positioned in clusters such that an incursion region 400 is formed. The incursion region 400 is a portion of the abradable layer 120 and/or the blade track 100 that includes fewer abradable ceramic fibers 124 than other portions of the abradable layer 120. Alternatively or in addition, the incursion region 400 may be a region of the abradable layer 120 and/or the blade track 100 having abradable ceramic fibers 124 arranged further apart from one another compared to other portions of the abradable layer 120. Put another way, the incursion region 400 of the abradable layer 124 and/or the blade track 100 may include a lower local fiber density than other portions of the abradable layer 120. Fewer and/or further spaced abradable ceramic fibers 124 in the incursion regions 400 may facilitate incursion of the blades 102 into the abradable layer 120 and forming of a recess or indentation in which the blades 102 may be guided during operation of the gas turbine engine. Alternatively or in addition, a lower fiber presence in the incursion regions 400 may provide increased thermal protection to the blade track 100 where the blade track 100 would typically be exposed to the hottest temperatures at least because the abradable matrix material 126 may have a lower thermal conductivity than the abradable ceramic fibers 124.

Figure 5:
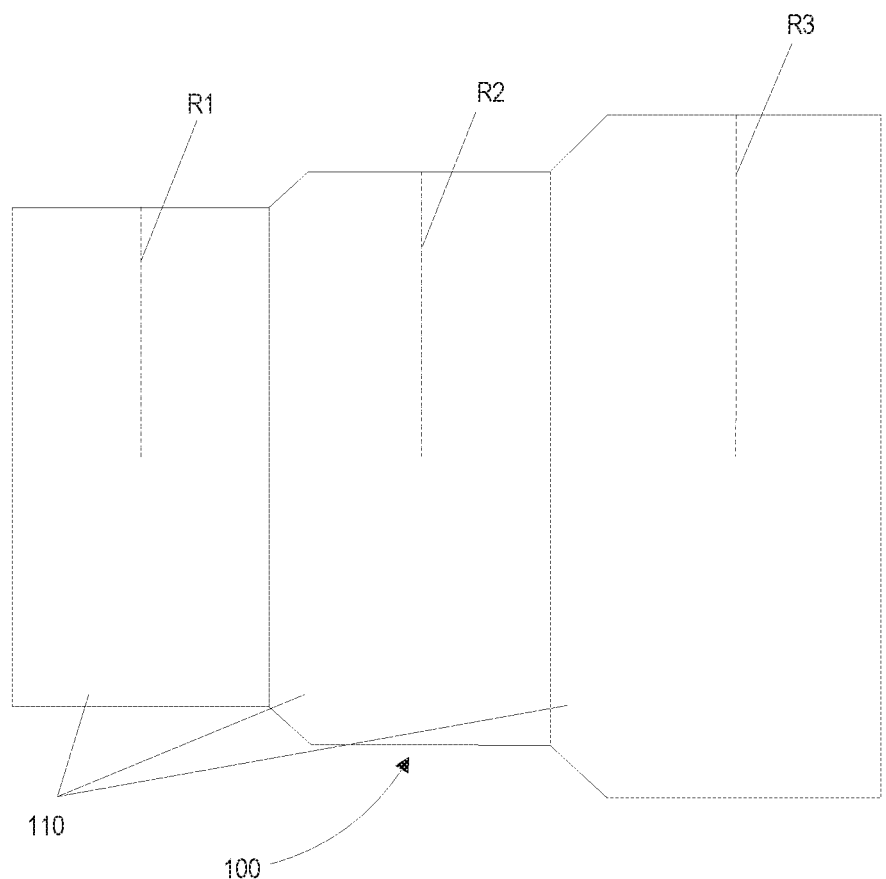
FIG. 5 shows an example series of blade tracks or blade track portions having different radii.

FIG. 5 shows a side view of a series of blade tracks 100 having different radii R1, R2, and R3. The blade tracks 100 shown in FIG. 5 are a side view of annularly-shaped blade tracks 100. The radii R1, R2, and R3 show a distance from the center of the blade track 100 annulus to an outer edge of the structural layer 110. In some examples, several blade tracks 100 or blade track portions may be manufactured simultaneously. The blade tracks 100 or blade track portions may be separated or kept together. The series of blade tracks 100 may be formed from any of the methods described herein.

Figure 6:
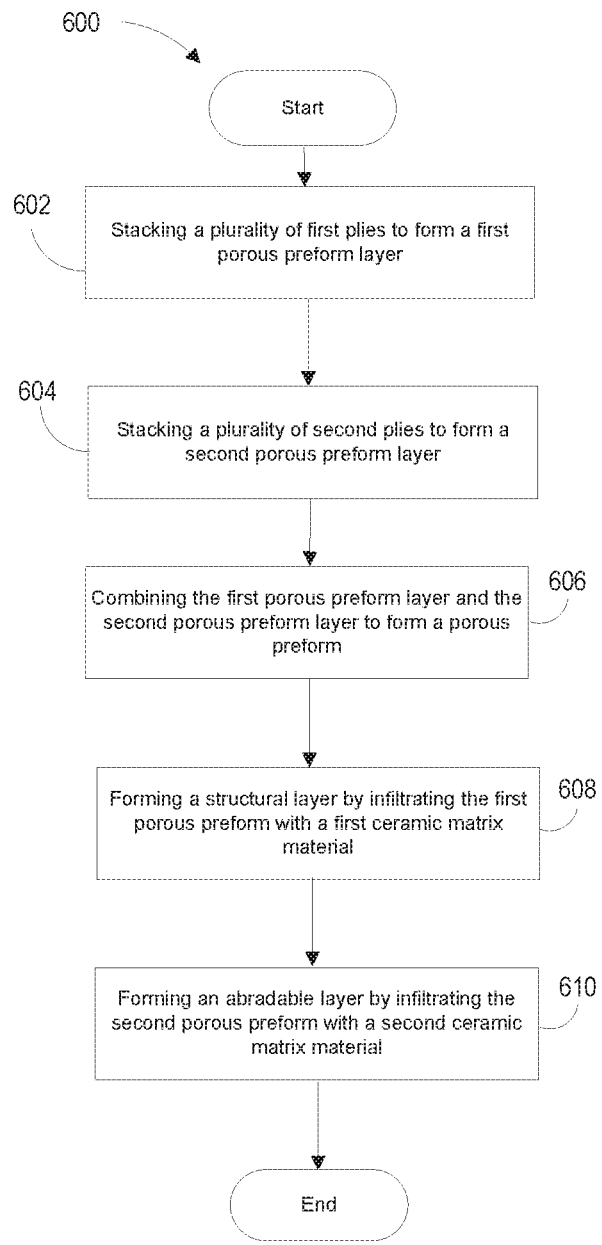
FIG. 6 illustrates a flow diagram of an example of a method of making the blade track.

FIG. 6 illustrates a flow diagram 600 of an example of a method of making the blade track 100. The steps of the method may include additional, different, or fewer operations than illustrated in FIG. 6. The steps may be executed in a different order than illustrated in FIG. 6.

The method may include stacking 602 structural plies 112 to form a first porous preform layer. The method may further include stacking 604 abradable plies 122 to form a second porous preform layer. The first porous preform layer may be combined 606 with the second porous preform layer to form a unified porous preform having both structural ceramic fibers 114 and abradable ceramic fibers 124. In some examples, The first porous preform layer may be combined 606 to the second porous preform layer by simply stacking the first porous preform layer onto the second porous preform layer. Alternatively or in addition, the first porous preform layer and the second porous preform layer may be combined 606 by threading a fiber between the first porous preform layer and the second porous preform layer. The method may further include forming 608 the structural layer 110 by infiltrating the first porous preform with the first ceramic matrix material 116. The method may further include forming 610 the abradable layer 120 by infiltrating the second porous preform with the second ceramic matrix material 126.

The structural plies 112 include the structural ceramic fibers 114 which may be continuous fibers, discontinuous fibers, or both. Likewise, the abradable plies 122 include the abradable ceramic fibers 124 which may include continuous fibers, discontinuous fibers, or both. The discontinuous fibers may be obtained from a supplier and/or the discontinuous fiber may be made by chopping or otherwise separating a source fiber into the discontinuous fibers. In some examples, the method may include applying a resin to the structural ceramic fibers 114 and/or the abradable ceramic fibers 124 in order to form the structural plies 112 and/or the abradable plies 122, respectively. The resin may bind the structural ceramic fibers 114 to other structural ceramic fibers 114 in the structural plies 112. The resin may alternatively or in addition, bind the abradable ceramic fibers 124 to other abradable ceramic fibers 124 in the abradable plies 122. Alternatively or in addition, the structural plies 112 may be bound to other structural plies 112 by a tape. Likewise, the abradable plies 122 may be bound to other abradable plies 122 by the tape. In some examples, the tape may be unidirectional tape.

In some examples, a fugitive fiber may be included in the structural layer 110 and/or the abradable layer 120. The fugitive fiber may be removed by thermal decomposition leaving a space within the structural layer 110 and/or the abradable layer 120 that was occupied by the fugitive fiber. The amount and position of the fugitive fibers may be predetermined such that the structural layer 110 and/or the abradable 120 have a target porosity as a result of the removal of the fugitive fiber.

In some examples, the method may include forming the blade track 100 into an annulus. Alternatively or in addition, the blade track 100 may be formed into a segment of an annulus. The method may include coupling multiple blade track segments together to form the blade track 100.

In some examples, a fiber chopper gun may be used. For example, the fiber chopper gun method may chop or separate a source fiber into discontinuous fibers. In addition, the fiber chopper gun method may include applying ceramic matrix material to the discontinuous fiber. The ceramic matrix material may be applied to the discontinuous fibers simultaneously to the chopping of the source fiber or as a separate, discrete process.

Figure 7:
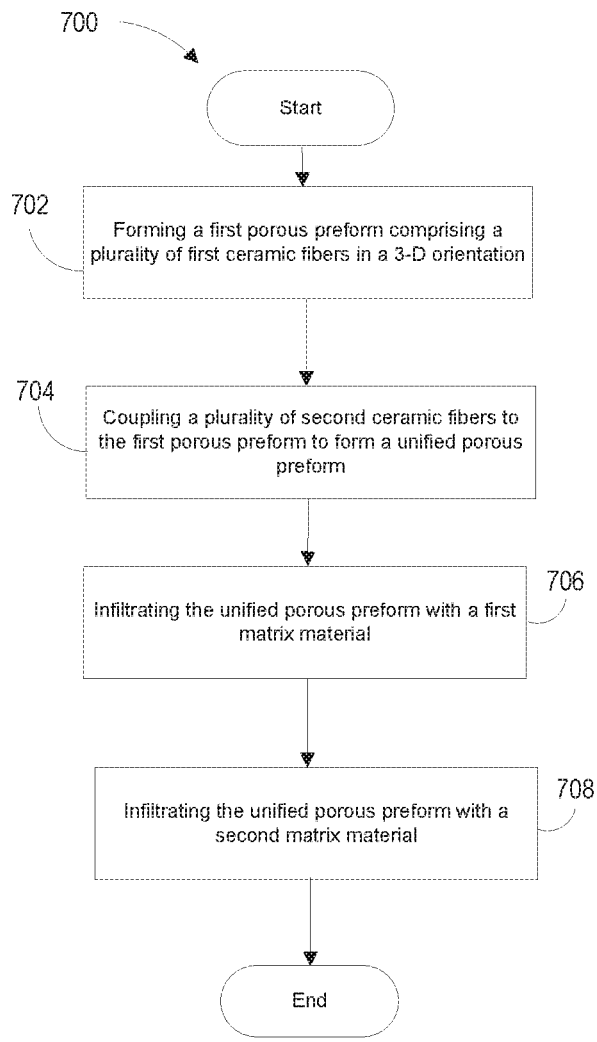
FIG. 7 illustrates a flow diagram of an example of a method of making the blade track.

FIG. 7 illustrates a flow chart of another example method of making the blade track 100. The steps of the method may include additional, different, or fewer operations than illustrated in FIG. 7. The steps may be executed in a different order than illustrated in FIG. 7.

The method may include forming 702 a first porous preform including the structural ceramic fibers 114 in a 3-D orientation. The method may further include coupling 704 and/or integrally forming the abradable ceramic fibers 124 to the first porous preform to form a unified porous preform including the structural ceramic fibers 114 and the abradable ceramic fibers 124. The method may further include infiltrating 706 a portion of the unified porous preform including the structural ceramic fibers 114 with the structural matrix material 116. The method may further include infiltrating 708 a portion of the unified porous preform including the abradable ceramic fibers 124 with the abradable matrix material 126.

In some examples, a fugitive fiber may be included in the structural layer 110 and/or the abradable layer 120. The fugitive fiber may be removed by thermal decomposition leaving a space within the structural layer 110 and/or the abradable layer 120 that was occupied by the fugitive fiber. The amount and position of the fugitive fibers may be predetermined such that the structural layer 110 and/or the abradable 120 have a target porosity as a result of the removal of the fugitive fiber.

In some examples, the coupling of the abradable ceramic fibers 124 to the first porous preform forms the interface 304. The continuous fiber may be woven into the 3-D orientation of the structural ceramic fibers 112 and the abradable ceramic fibers 122 such that the continuous fiber is positioned in both the structural layer 110 and the abradable layer 124 and crosses the interface 304. The continuous fiber may facilitate the coupling or integral unity of the structural layer 110 to the abradable layer 120.

In some examples, the method may include making several blade tracks 100 or blade track portions simultaneously in a single, unified structure. The blade tracks 100 or blade track portions may be separated or kept together. The several blade tracks 100 may be formed from any of the methods described herein. The several blade tracks 100 or blade track portions may have radii different from other of the blade tracks 100 or blade track portions made.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, and not the only possible embodiments and implementations.

The subject-matter of the disclosure may also relate, among others, to the following aspects:

1. A method comprising:
    forming a first porous preform layer comprising a plurality of first ceramic fibers, the first ceramic fibers woven together in a 3-D orientation;
    coupling a plurality of second ceramic fibers to the first porous preform to form a second porous preform layer, the first porous preform layer and the second porous preform layer together forming a unified porous preform, the second ceramic fibers woven together in the 3-D orientation;
    forming a structural layer by infiltrating the first porous preform layer with a first ceramic matrix material; and
    forming an abradable layer by infiltrating the second porous preform layer with a second ceramic matrix material, wherein the structural layer and the abradable layer form a blade track.
2. The method of aspect 1 further comprising infiltrating the second porous preform layer with a fugitive fiber.
3. The method of aspect 2 further comprising removing the fugitive fiber from the abradable layer.
4. The method of any of aspects 1 to 3, wherein coupling the plurality of second ceramic fibers to the structural layer forms an interface between the structural layer and the abradable layer and a third ceramic fiber is positioned in the abradable layer and the structural layer and crosses the interface.
5. The method of any of aspects 1 to 4, further comprising forming the blade track into an annulus.
6. The method of aspect 5, wherein the annulus comprises a first portion and a second portion, the first portion comprising a first radius and the second portion comprising a second radius, a length of the first radius being nonequal to a length of the second radius.
7. A method comprising:
    stacking a plurality of first plies to form a first porous preform layer, the first plies comprising a plurality of first ceramic fibers;
    stacking a plurality of second plies to form a second porous preform layer, the second plies comprising a plurality of second ceramic fibers;
    combining the first porous preform layer and the second porous preform layer to form a unified porous preform;
    forming a structural layer by infiltrating the first porous preform with a first ceramic matrix material; and
    forming an abradable layer by infiltrating the second porous preform with a second ceramic matrix material, wherein the structural layer and the abradable layer form a blade track.
8. The method of aspect 7, wherein at least one of the first ceramic fibers or the second ceramic fibers comprise a plurality of discontinuous fibers; and
    applying the first ceramic matrix material to the discontinuous fibers or applying the second ceramic matrix material to the discontinuous fibers.
9. The method of aspect 8, further comprising chopping a source fiber to obtain the discontinuous fibers, and wherein applying the first ceramic matrix material to the discontinuous fibers or applying the second ceramic matrix material to the discontinuous fibers occurs simultaneously to chopping the source fiber.
10. The method of any of aspects 7 to 9, further comprising removing a fugitive fiber from the abradable layer.
11. The method of any of aspects 7 to 10, wherein at least one of the first ceramic fibers or the second ceramic fibers comprise discontinuous fibers, and the method further comprising.
12. The method of any of aspects 7 to 11, further comprising forming the blade track into an annulus.
13. The method of any of aspects 7 to 12, wherein the blade track is a first blade track and the method further comprises forming a second blade track by coupling the stacked abradable layer to the stacked structural layer, and coupling the first blade track to the second blade track.
14. A ceramic matrix composite blade track comprising:
    structural layer comprising a first ceramic matrix composite, the first ceramic matrix composite including a plurality of first ceramic fibers and a first matrix material, the first ceramic fibers comprising a first oxide material; and
    an abradable layer comprising a second ceramic matrix composite, the second ceramic matrix composite layer including a plurality of second ceramic fibers and a second matrix material, the second ceramic fibers comprising a second oxide material, the second oxide material being different from the first oxide material, the second ceramic matrix material being different from the first ceramic matrix material, and the abradable layer adjacent to the structural layer.

15. The ceramic matrix composite blade track of aspect 14, wherein the first ceramic fibers comprise alumina or aluminosilicate fibers and wherein the second ceramic fibers comprise at least one of silicate glass, alumina, or aluminosilicate.

16. The ceramic matrix composite blade track of any of aspects 14 or 15, wherein the abradable layer has a lower local fiber density than the structural layer.

17. The ceramic matrix composite blade track of any of aspects 14 to 16, wherein the structural layer is integral to the abradable layer.

18. The ceramic matrix composite blade track of any of aspects 14 to 17, wherein the structural layer and the abradable layer are in a shape of an annulus, and the abradable layer is located radially inward from the structural layer.

19. The ceramic matrix composite blade track of any of aspects 14 to 18, wherein at least one of the first ceramic fibers or the second ceramic fibers include continuous fibers.

20. The ceramic matrix composite blade track of claim 14, wherein the abradable layer comprises a first region and a second region, the first region having a lower local fiber density than the second region.

What is claimed is:

1. A method comprising:
    forming a first porous preform layer comprising a plurality of first ceramic fibers, the first ceramic fibers woven together in a 3-D orientation and comprising a first oxide material;
    coupling a plurality of second ceramic fibers to the first porous preform to form a second porous preform layer, the second ceramic fibers comprising a second oxide material different from the first oxide material, the first porous preform layer and the second porous preform layer together forming a unified porous preform, the second ceramic fibers woven together in the 3-D orientation;
    forming a structural layer by infiltrating the first porous preform layer with a first ceramic matrix material; and
    forming an abradable layer by infiltrating the second porous preform layer with a second ceramic matrix material different from the first ceramic material, wherein the structural layer and the abradable layer form a blade track.

2. The method of claim 1 further comprising infiltrating the second porous preform layer with a fugitive fiber.

3. The method of claim 2 further comprising removing the fugitive fiber from the abradable layer.

4. The method of claim 1, wherein coupling the plurality of second ceramic fibers to the structural layer forms an interface between the structural layer and the abradable layer and a third ceramic fiber is positioned in the abradable layer and the structural layer and crosses the interface.

5. The method of claim 1, further comprising forming the blade track into an annulus.

6. The method of claim 5, wherein the annulus comprises a first portion and a second portion, the first portion comprising a first radius and the second portion comprising a second radius, a length of the first radius being nonequal to a length of the second radius.

7. The method of claim 1, wherein the abradable layer has a lower local fiber density than the structural layer.

8. The method of claim 1, wherein the abradable layer comprises a first region and a second region, the first region having a lower local fiber density than the second region.

9. The method of claim 1, wherein the first ceramic fibers comprise alumina or aluminosilicate fibers and wherein the second ceramic fibers comprise at least one of silicate glass, alumina, or aluminosilicate.

10. A method comprising:
    stacking a plurality of first plies to form a first porous preform layer, the first plies comprising a plurality of first ceramic fibers;
    stacking a plurality of second plies to form a second porous preform layer, the second plies comprising a plurality of second ceramic fibers;
    combining the first porous preform layer and the second porous preform layer to form a unified porous preform;
    forming a structural layer by infiltrating the first porous preform with a first ceramic matrix material;
    forming an abradable layer by infiltrating the second porous preform with a second ceramic matrix material, wherein the structural layer and the abradable layer form a first blade track; and
    forming a second blade track by coupling the stacked abradable layer to the stacked structural layer, and coupling the first blade track to the second blade track.

11. The method of claim 10, wherein at least one of the first ceramic fibers or the second ceramic fibers comprise a plurality of discontinuous fibers; and
    applying the first ceramic matrix material to the discontinuous fibers or applying the second ceramic matrix material to the discontinuous fibers.

12. The method of claim 11, further comprising chopping a source fiber to obtain the discontinuous fibers, and wherein applying the first ceramic matrix material to the discontinuous fibers or applying the second ceramic matrix material to the discontinuous fibers occurs simultaneously to chopping the source fiber.

13. The method of claim 10, further comprising removing a fugitive fiber from the abradable layer.

14. The method of claim 10, wherein at least one of the first ceramic fibers or the second ceramic fibers comprise discontinuous fibers.

15. The method of claim 10, further comprising forming the blade track into an annulus.

* * * * *